No. 797,843. PATENTED AUG. 22, 1905.
D. W. DALEY.
WATER DISTILLING APPARATUS.
APPLICATION FILED NOV. 17, 1904.
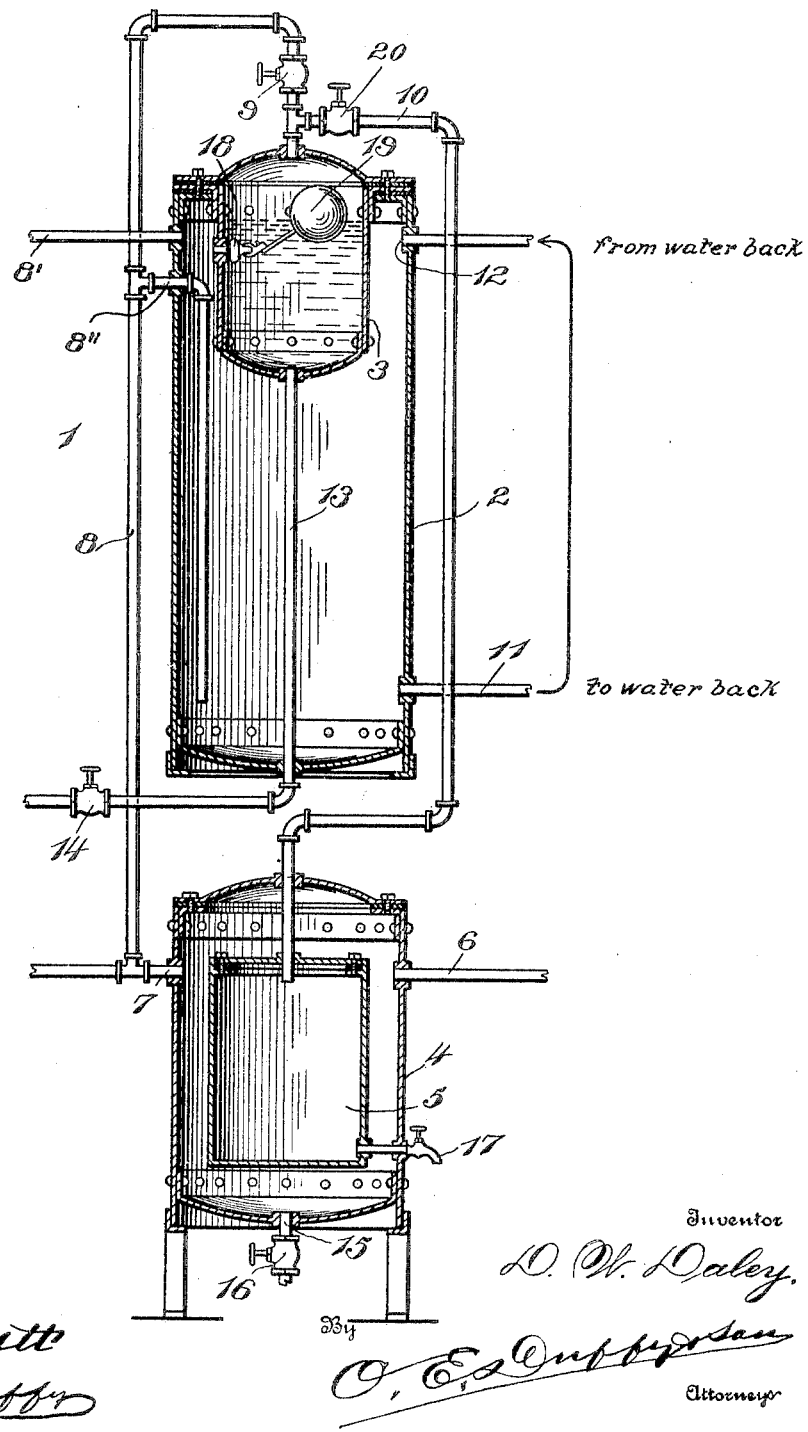

UNITED STATES PATENT OFFICE.

DENNIS WILLIAM DALEY, OF PARKERSBURG, WEST VIRGINIA, ASSIGNOR OF ONE-FIFTH TO CHARLES A. GUNN, OF PITTSBURG, PENNSYLVANIA.

WATER-DISTILLING APPARATUS.

No. 797,843.     Specification of Letters Patent.     Patented Aug. 22, 1905.

Application filed November 17, 1904. Serial No. 233,175.

*To all whom it may concern:*

Be it known that I, DENNIS WILLIAM DALEY, a citizen of the United States, residing at Parkersburg, in the county of Wood and State of West Virginia, have invented certain new and useful Improvements in Water-Distilling Apparatus; and I do declare the following to be a full, clear, and exact description of the invention, such as will enable others skilled in the art to which it appertains to make and use the same, reference being had to the accompanying drawing, and to the figures of reference marked thereon, which forms a part of this specification.

My invention relates to an apparatus for distilling water, which is particularly designed to be used in connection with a domestic water-heater; and my invention has for its object to provide a device of this class which will quickly and effectually distil water, the device being extremely simple in its construction, cheap and easy to manufacture, requiring a small amount of space, and composed of a minimum number of parts.

With these objects in view my invention consists in the novel construction and arrangement of parts, and particularly the arrangement for connecting the tanks, the relative location of the tanks being immaterial.

Referring to the accompanying drawing, the figure is a vertical sectional view of the distilling apparatus constructed in accordance with my invention.

In the drawing, 1 indicates the device, which comprises the usual domestic hot-water tank 2, a small distilling-tank 3, located in said tank 2, at the top thereof, a tank 4, associated with said tank 2, and a distilled-water tank 5 within said tank 4. The tank 4 is connected to the water-supply by means of the pipe 6, the water for usual domestic purposes and for the tanks 2 and 3 passing through said tank 4 and passing out thereof through the pipe 7. Connecting the pipe 7 with the tank 2 is a pipe 8, said pipe also connecting with the distilling-tank 3 for a purpose which will be hereinafter fully described, a cut-off valve or cock 9 being located in the pipe 8 near the tank 3, as shown. Connecting with the pipe 8 between the cut-off 9 and the tank 3 is a pipe 10, which passes to the distilled-water tank 5 within the tank 4, as shown. A pipe 11, connecting with the tank 2, near the bottom thereof, passes through the domestic heater or range and again enters the said tank at 12. A pipe 13, leading from the bottom of the tank 3 through the tank 2 and out through the bottom of said tank to the waste-pipe, is provided with a cut-off valve or cock 14 on the outside of said tank 2, as shown, and a pipe 15, provided with a cut-off valve or cock 16, is connected to the bottom of the tank 4, as shown, for a purpose which will be hereinafter fully described.

8' indicates a pipe leading from tank 2, furnishing hot water for domestic purposes, and 8'' is a pipe connected to pipe 8 and leading water therefrom to the bottom of tank 2.

The distilled-water tank 5 is provided with a spigot 17 to draw off the distilled water as needed.

Having thus fully described my invention, its operation is as follows: Water from the water-supply passes into the tank 4 through pipe 6 and circulates around the distilled-water tank 5, passing out through pipe 7 to be used for usual domestic purposes and also into pipe 8. The tank 2 is fed from pipe 8, the water in said tank passing out through pipe 11, circulating through the heater, and returning to tank 2 at 12. The water thus heated enters the distilling-tank 3 through valve 18, which is so controlled by a ball-float 19 as to cause a space between the water therein and the top of the tank for the formation of steam. The steam then passes into the pipe 10 and into the distilled-water tank 5, where it is suddenly cooled by the circulation of cold water in the tank 4, the water thus formed in the distilled-water tank 5 being drawn off through spigot 17. Continued use of the apparatus causes a sediment to form within the distilling-tank 3, and the same is periodically flushed by opening the cut-off valve or cock 9 in the pipe 8 and closing the cut-off valve or cock 20 in the pipe 10. The cut-off valve or cock 14 in the pipe 13, leading from the distilling-tank 3, is also opened, which allows a free circulation of water from the tank 4 through the distilling-tank 3, thus flushing the said latter tank and removing all sediment therefrom. Flushing the said tank may also be accomplished without the upper section of pipe 8 or valve 9, as the opening of valve 14 will release the water in tank 3, thus automatically opening valve 19 and admitting water for flushing purposes from tank 2. The tank 4 is also capable of being flushed by opening the cut-off valve or cock 16 in the pipe 15, connected to the bottom of said tank.

Having thus described my invention, I do not wish to be understood as limiting myself to the exact construction herein set forth, as various slight changes may be made therein which would fall within the limit and scope of my invention, and I consider myself clearly entitled to all such changes and modifications.

What I claim as my invention, and desire to secure by Letters Patent of the United States, is—

1. In a water-distilling apparatus, the combination of a tank connected to the water-supply, a distilled-water tank within said tank, a hot-water tank connected to said first-mentioned tank, a distilling-tank within said hot-water tank, said distilling-tank being connected to said distilled-water tank, substantially as described.

2. In a water-distilling apparatus, the combination of a tank connected to the water-supply, a distilled-water tank within said tank, a hot-water tank connected to said first-mentioned tank, a distilling-tank within said hot-water tank, a valve in said distilling-tank through which water passes into said distilling-tank from said hot-water tank, and a pipe connecting said distilling-tank with said distilled-water tank, substantially as described.

3. In a water-distilling apparatus, the combination of a hot-water tank adapted to receive water from the water-supply, a pipe leading from said tank to circulate the water from said tank through a heater and to return the heated water to said tank, a distilling-tank within said hot-water tank, means in said distilling-tank for allowing the hot water in said hot-water tank to enter said distilling-tank, a pipe for leading the steam from said distilling-tank, substantially as described.

In testimony whereof I affix my signature in presence of two witnesses.

DENNIS WILLIAM DALEY.

Witnesses:
   J. A. SAINT,
   JOHN M. DAVIES.